US011738332B2

(12) United States Patent
Wu et al.

(10) Patent No.: US 11,738,332 B2
(45) Date of Patent: Aug. 29, 2023

(54) METAL ALLOY/OXIDE COMPOSITE CATALYST FOR AMMONIA DECOMPOSITION

(71) Applicants: BETTERGY CORP., Peekskill, NY (US); THE RESEARCH FOUNDATION FOR THE STATE UNIVERSITY OF NEW YORK, Amherst, NY (US)

(72) Inventors: Gang Wu, Clarence Center, NY (US); Shreya Mukherjee, Buffalo, NY (US); Zhong Tang, Pompton Plains, NJ (US); Bo Lu, Croton-on-Hudson, NY (US)

(73) Assignees: Bettergy Corporation, Peekskill, NY (US); The Research Foundation For The State Univ. Of NY, Amherst, NY (US)

( * ) Notice: Subject to any disclaimer, the term of this patent is extended or adjusted under 35 U.S.C. 154(b) by 179 days.

(21) Appl. No.: 16/920,056

(22) Filed: Jul. 2, 2020

(65) Prior Publication Data
US 2021/0001311 A1    Jan. 7, 2021

Related U.S. Application Data (60) Provisional application No. 62/870,077, filed on Jul. 3, 2019.

(51) Int. Cl.
*B01J 23/755* (2006.01)
*C01B 3/04* (2006.01)
*B01J 23/83* (2006.01)
*B01J 23/00* (2006.01)
*B01J 23/28* (2006.01)

(52) U.S. Cl.
CPC ............. *B01J 23/83* (2013.01); *B01J 23/002* (2013.01); *C01B 3/047* (2013.01); *B01J 23/28* (2013.01)

(58) Field of Classification Search
CPC .......... B01J 23/002; B01J 23/83; C01B 3/047
See application file for complete search history.

(56) References Cited

U.S. PATENT DOCUMENTS

| 3,451,949 A * | 6/1969 | Topsoe .................. C10G 11/10 48/214 A |
| 5,055,282 A | 10/1991 | Shikada et al. |
| 5,976,723 A | 11/1999 | Boffito et al. |

(Continued)

FOREIGN PATENT DOCUMENTS

| CN | 108380218 A * | 8/2018 | |
| WO | WO-2018026246 A1 * | 2/2018 | .............. B01J 21/10 |

OTHER PUBLICATIONS

Machine translation of CN 10838018A, publication date Aug. 10, 2018.*

(Continued)

*Primary Examiner* — Jun Li
(74) *Attorney, Agent, or Firm* — Robert W Morris (57) ABSTRACT

The present invention discloses a series of ammonia decomposition catalysts, the method of making such catalysts and the use of such catalysts. The said catalysts are made of composite metal or metal alloys supported on composite oxides or nitrides as the catalyst supports. The catalysts are useful in ammonia decomposition at various temperatures and pressures, including temperatures below 500° C. and pressures up to 30 atm.

8 Claims, 7 Drawing Sheets

(56) References Cited

U.S. PATENT DOCUMENTS

| | | |
|---|---|---|
| 6,555,084 B2 | 4/2003 | Ohtsuka |
| 9,138,726 B2 | 9/2015 | Wang et al. |
| 9,670,063 B2 | 6/2017 | David et al. |
| 2003/0232224 A1 | 12/2003 | Kordesch et al. |
| 2004/0054016 A1* | 3/2004 | Lu .......................... B01J 23/83 |
| | | 518/726 |
| 2009/0060809 A1 | 3/2009 | Shioya et al. |
| 2011/0176988 A1 | 7/2011 | Okamura et al. |
| 2012/0015266 A1* | 1/2012 | Melo Faus ............ B01J 37/036 |
| | | 423/652 |
| 2015/0014592 A1* | 1/2015 | D'Souza .................. B01J 23/10 |
| | | 252/373 |
| 2016/0289068 A1 | 10/2016 | Jones et al. |
| 2020/0164346 A1 | 5/2020 | Jiang et al. |

OTHER PUBLICATIONS

Zhang et al, Development of stable bimetallic catalysts for carbon dioxide reforming of methane, Journal of Catalysis 249 (2007) 300-310.*

Takanabe et al., Titania-supported cobalt and nickel bimetallic catalysts for carbon dioxide reforming of methane, Journal of Catalysis 232 (2005) 268-275.*

* cited by examiner

METAL ALLOY/OXIDE COMPOSITE CATALYST FOR AMMONIA DECOMPOSITION

CROSS REFERENCE TO RELATED APPLICATIONS

This application claims priority to U.S. Provisional Patent Application No. 62/870,077 filed Jul. 3, 2019, the disclosure of which is incorporated herein in its entirety.

STATEMENT REGARDING GOVERNMENT SPONSORED RESEARCH OR DEVELOPMENT

The work described here was supported by US Department of Energy, ARPA-E (Award No. DE-AR0000817). The Federal Government may have certain rights in this work.

This invention was made with the support of the New York State Energy Research and Development Authority (NYSERDA) under Agreement Number 141102 and NYSERDA may have rights in this invention.

FIELD OF THE INVENTION

The present invention is directed a series of catalysts, the method of making such catalysts and the use of such catalysts. The said catalysts are made of composite metal or metal alloys or metal nanoclusters supported on perovskites, composite oxides or nitrides, or mixed oxides or mixed nitrides as the catalyst supports in the form of, but not limited to, powder, sphere, slab, pellet, or hollow cylinder. Such catalysts are well positioned to be used in ammonia decomposition with almost complete conversion at temperatures below 500° C. These catalysts are also well positioned to be used in ammonia decomposition with almost complete conversion at temperatures above 500° C. The catalysts can also be coupled with a membrane reactor to combine reaction and separations in process that can be used in ammonia decomposition membrane reactor at various temperatures (e.g., 100° C., 200° C., 300° C., 400° C., 500° C., 600° C., 700° C., 800° C., and higher temperatures) and pressures (e.g., 5 atm, 10 atm, 15 atm, 20 atm, 25 atm, 30 atm, 35 atm, 40 atm, 45 atm, 50 atm, and higher pressures).

BACKGROUND OF THE INVENTION

1. Ammonia Decomposition

Ammonia decomposition is a commercial process in the chemical industry and recently has become of interest as a clean, safe, and renewable source of hydrogen for fuel-cell vehicles. Ammonia decomposition is endothermic. It generates two moles of products per mole of reactant.

$NH_3 <=> \frac{1}{2}N_2 + 3/2H_2$ (4H°=45.6 kJ/mol)

Thermodynamically, the ammonia conversion rate increases with the temperature and decreases with the pressure. Since higher pressure ammonia decomposition is preferred for the compact design of the membrane reactor, conversion rate issues need to be addressed. The hydrogen for fuel cells should contain no ammonia because ammonia can slowly poison proton exchange membrane fuel cells (PEMFCs) and the recovery of the PEMFC from ammonia poisoning is very slow due to the relatively slow diffusion of ammonium in the PEM. Therefore, a complete conversion of the ammonia is desirable for hydrogen generation from ammonia decomposition and an ammonia recirculation system needs to be introduced to reduce ammonia content in the fuel stream from 300 to 0 ppm.

Kinetically, the ammonia dissociation rate depends on the temperature, and catalyst type. The reaction rate is greatly increased by operation at temperatures above 700° C. High temperature operation at on-site hydrogen refueling stations, however, is not desirable due to several reasons, including the high cost of the equipment required at that high temperature, energy costs, and catalyst stability concerns.

2. Ammonia Decomposition Catalysts (Prior Art Analysis)

U.S. Pat. Nos. 5,055,282 and 5,976,723 and U.S. Pat. App. Pub. No. 2020/0164346 disclose ruthenium-based catalysts for cracking ammonia into hydrogen and nitrogen in a decomposition reactor. The problem with Ru is that it is a noble metal which is expensive and scarcely available and its use in the decomposition of ammonia will significantly increase the cost of the hydrogen generation process. Thus, there are catalysts which combine non-precious metal along with precious metal to reduce the use of noble metals. US Application 20090060809A1 is based on a metallic element selected from Fe, Co, Ni and Cu by ion exchange method, supported on porous silica alumina having an Si/Al atomic ratio along with a noble metal selected from Ru, Rh, Pd, Ir and Pt in an amount of 10 ppm to 500 ppm based on the total mass of the catalyst.

U.S. Pat. No. 9,670,063, and U.S. Pa. App. Pub. No. 2016/0289068A1 disclose alkali metal amides (such as $NaNH_2$, $LiNH_2$) and nitride-imide composite catalysts for cracking ammonia into hydrogen and nitrogen in a decomposition reactor. At 450° C. and atmospheric pressure, the catalyst gives ammonia conversion of 54.9%. The issue with the alkali metal amides-based catalyst is that the high activity of the catalyst during the reaction lasts only hours, which is not practical for industrial application.

U.S. Pat. No. 9,138,726 taught a copper-based catalyst comprising: a porous oxide support and a low valent copper compound mixing with the porous oxide support by an acid hydrothermal method; wherein the low valent copper compound with is Cu and $Cu_2O$. However, their work is focused on production of $N_2$ and they use a flux of $O_2$ and $NH_3$ mixture for low temperature combustion.

The present invention includes of composite metal or metal alloys or metal nanoclusters supported on perovskites, composite oxides or nitrides, or mixed oxides or mixed nitrides as the catalyst supports in the form of, but not limited to, powder, sphere, slab, pellet, or hollow cylinder. Such catalysts are well positioned to be used in ammonia decomposition with almost complete conversion at temperatures below 500° C. These catalysts are also well positioned to be used in ammonia decomposition with almost complete conversion at temperatures above 500° C. The catalysts can also be coupled with a membrane reactor to combine reaction and separations in process that can be used in ammonia decomposition membrane reactor at various temperatures (e.g., 100° C., 200° C., 300° C., 400° C., 500° C., 600° C., 700° C., 800° C., and higher temperatures) and pressures (e.g., 5 atm, 10 atm, 15 atm, 20 atm, 25 atm, 30 atm, 35 atm, 40 atm, 45 atm, 50 atm, and higher pressures). For instance, such catalysts can promote ammonia decomposition with complete conversion at various temperatures (e.g., 100° C., 200° C., 300° C., 400° C., 500° C., 600° C., 700° C., 800° C., and higher temperatures). The catalysts could also be coupled with a membrane reactor to combine reaction and separations in process that can be used in ammonia decomposition membrane reactor at various temperatures (e.g., 100° C., 200° C., 300° C., 400° C., 500° C., 600° C., 700° C., 800° C., and higher temperatures) and pressures (e.g., 5 atm, 10 atm, 15 atm, 20 atm, 25 atm, 30 atm, 35 atm, 40 atm, 45 atm, 50 atm, and higher pressures).

One notable benefit to the present invention is that a catalyst may be used for ammonia decomposition at relatively high conversion rates at relatively low temperatures and low pressures. While persons of ordinary skill in the art will recognize that the catalysts described herein are capable of assisting in ammonia decomposition at high temperatures (e.g., above 500° C.) and pressures (e.g., above 30 atm), these catalysts are further capable of assisting in ammonia decomposition at temperatures below 500° C. and below 30 atm. Due to the viability of these catalysts to assist in ammonia decomposition at relatively low temperatures and pressures, ammonia decomposition may be accomplished with greater energy efficiency, low costs, and at a greater overall conservation of resources.

BRIEF SUMMARY OF THE DRAWINGS

This invention may be more readily understood by reference to the following drawings wherein.

DETAILED DESCRIPTION

In an embodiment, a catalyst for ammonia decomposition may be provided. The catalyst may contain bimetallic nanoclusters or an alloy. The nanocluster or alloy may include at least one element (A) selected from cobalt, iron, chromium, manganese, vanadium combined with at least one element (B) selected from nickel, copper, niobium. The bimetallic nanoclusters or alloy may supported on a mixed oxide or a mixed nitride or perovskite formed of at least one element from alkaline earth metal (C), including, but not limited to, magnesium, calcium, strontium or barium and at least one metal from rare earth metal (D), including, but not limited to, cerium, lanthanum, praseodymium. The perovskite may alternatively be formed of at least one element (E) selected from zirconium, molybdenum or titanium.

The composite catalyst may also be promoted with alkali metals such as potassium, cesium or sodium. The chemical form of each element (A) to (D) in the catalyst (X) can be confirmed by a known method such as X-ray diffraction method (XRD). That is, the chemical form of each element (A) to (D) can be confirmed by measuring the catalyst (X). Element (A) and (B) may preferably be in the form of metal clusters or metal alloys. Small amount of oxides may be detected likely due to exposure of the sample in air during measurement. The element (C) and (D) may form mixed oxides or mixed nitrides where the composition of the individual elements is obtained using XPS study. Raw material used for synthesis could be salts of metal nitrate, metal acetates or metal sulfates. Metal chlorides, as precursors, may affect the catalytic activity if not completely removed.

[Method for Preparing Catalyst (X)]

There are no particular restrictions on the preparation method of the catalyst (X). In an embodiment, the catalyst includes the elements (A) to (C), and the components are uniformly dispersed. A precipitation method, such as deposition precipitation or co-precipitation method, may be performed for easier scalability of the synthesis technique. Any type of alkali may be used for precipitation. In an embodiment, a pH between 9 and 11 may be maintained during precipitation.

Solution (1) may consist of aqueous mixture of element (A), (B) and (C+D), where the molar ratio of (A) and (B) and mass ratio of (A and B) to (C+D) are accurately controlled. Solution (2) consists of alkali solution with a minimum concentration of 2M. The concentration of the alkali may vary between 2M and 5M.

In an embodiment, Solution (1) may be added into solution (2) at a controlled rate to prevent aggregation of the particles. For instance, solution (1) may be added into solution (2) dropwise at a rate of 1 ml/min. The final solution may be continuously stirred using a magnetic stirrer at a rate of 200 rpm. Upon complete mixing, the stirring may be stopped, and the final solution may be allowed to age for at least 4 to 12 hours. After aging, the precipitate may be separated from the solution by centrifugation followed by washing with water. Washing and centrifugation steps may be repeated at least four times. After complete washing, the precipitate may be dried in a petri dish under vacuum at 60° C. for 8 to 12 hours. This may be followed by thermal reduction in reducing atmosphere at temperatures ranging from 400-700° C. The ramping rate may be maintained between 2-5° C./min. The reducing gas may be flown at a rate of 100 ml min-. The reducing gas may be 10% $H_2$ balanced by Ar. The thermal reduction may then be done for a period of 1 hour. In an embodiment, the sample may further be treated in an inert atmosphere for 1 hour to passivate the catalyst for storage and transportation. The catalyst may undergo an activation process at temperatures between 500-600° C. before reaction.

[Element (A)]

The element (A) may be in the form of metal clusters. Alternatively, the element (A) may be a metal that forms an alloy with, or clusters with, an element (B). Component (A) and (B) may be in the form of oxides. The metallic alloy formation or metallic clusters is most preferable. Element (A) may be selected from cobalt, iron, chromium, manganese, or vanadium but is preferable cobalt.

[Element (B)]

The element (B) may be at least one element selected from selected from nickel, copper, niobium. The element (B) should preferably be in the form of metal clusters, or metal that forms an alloy with or clusters with an element (A). Component (A) and (B) should not be in the form of nitrides or carbides, though they could be in the form of oxides. However, the metallic alloy formation or metallic clusters is most preferable. Specific examples of the chemical form other than metallic clusters or metallic alloys are oxide or complex oxide.

[Element (C)]

Element (C) may be at least one element from alkaline earth metal (C), such as magnesium, calcium, strontium or barium and at least one metal from rare earth metal(D), such as cerium, lanthanum, praseodymium, or at least one element (E) selected from zirconium, molybdenum or titanium. The element (C) could be in the form of metal, or metal oxides, or metal nitrides, mixed metal oxides being most preferable. Among the elements in (C), at an element may be included from the group of lanthanides, which may be cerium or lanthanum or praseodymium and the mass ratio of the rare earth element may be less than 10%.

WORKING EXAMPLES

Examples 1 and 2 are described here to demonstrate the preparation process of the catalyst CoNi—MgSrCeO$_4$, and catalyst 1 wt % K—CoNi—MgSrCeO$_4$.

Catalyst Preparation Example 1

Example 1 provides a procedure of making CoNi—MgCeSrO$_4$ catalyst for ammonia decomposition.

4.36 g of cobalt nitrate, 2.31 g of nickel nitrate, 1.6 g of magnesium nitrate, 0.6 g of cerium nitrate and 0.7 g of strontium nitrate are added to 100 ml water to prepare solution 1. Solution 2 is prepared by adding 11 g of potassium hydroxide in 100 ml water. The two solutions are separately prepared and stirred till all the salts completely dissolve to give a clear solution. Then, solution 1 is added to solution 2 drop wise with a rate of 1 ml/min. The mixed solution is then aged for at least 16 h, preferably 24 h. This is followed by separating the precipitates by centrifugation at 9000 rpm for 3 min followed by washing with water. The centrifugation and washing is repeated at least thrice to remove all residues from the mixture. Then the mixture is dried in vacuum at 60° C. for 8 h. After drying, the solid residue is pulverized in a speed mixer or ball mill for 10 min. The fine powder is then thermally reduced at 600° C. for 1 h in a stream of 10% H$_2$ balanced by Ar. A ramping at a rate of 2° C./min is used to increase the temperature of furnace from 25° C. to 600° C.

Ammonia Decomposition Rate (6000 h$^{-1}$): 450° C.—90.5%, 475° C.—99.6%, 500° C.—100.0%

Catalyst Preparation Example 2

Example 2 provides a procedure of making potassium promoted 1 wt % K—CoNi—MgSrCeO$_4$ catalyst for ammonia decomposition.

Synthesis is repeated as in Example 1. After thermal reduction, the catalyst is dispersed in 1 wt % aqueous solution of potassium nitrate or ethanolic solution of 1 wt % of potassium hydroxide. This is followed by evaporating the solvent at 80° C. Once all the solvent evaporates, the residue is pulverized in a mortar or pestle or in a speed mixer at around 2000 rpm. The fine powder is then thermally reduced again at 600° C. for 1 h.

Ammonia Decomposition Rate (6000 h$^{-1}$): 450° C.—98.5%, 475° C.—100.0%, 500° C.—100%

Examples 3 to 6 are described here to demonstrate the preparation process of the catalyst CoNi—MgCeO$_3$, catalyst 1 wt % K—CoNi—MgCeO$_3$, catalyst Ca—CoNi—MgCeO$_3$, and catalyst Cs—CoNi—MgCeO$_3$.

Catalyst Preparation Example 3

Example 3 provides a procedure of making CoNi—MgCeO$_3$ catalyst for ammonia decomposition.

4.36 g of cobalt nitrate, 2.31 g of nickel nitrate, 1.6 g of magnesium nitrate, 0.6 g of cerium nitrate are added to 100 ml water to prepare solution 1. Solution 2 is prepared by adding 11 g of potassium hydroxide in 100 ml water. The two solutions are separately prepared and stirred till all the salts completely dissolve to give a clear solution. Then, solution 1 is added to solution 2 drop wise with a rate of 1 ml min$^{-1}$. The mixed solution is then aged for 8 h. This is followed by separating the precipitates by centrifugation at 8000 rpm for 5 min followed by washing with water. The centrifugation and washing is repeated at least thrice to remove all residues from the mixture. Then the mixture is dried in vacuum at 60° C. for 8 h. After drying, the solid residue is pulverized in a speed mixer or ball mill for 10 min. The fine powder is then thermally reduced at 600° C. for 1 h. A ramping at a rate of 2° C./min is used to increase the temperature of furnace from 25° C. to 600° C.

Ammonia Decomposition Rate (6,000 h$^{-1}$):450° C.—74.25%, 475° C.—94.50%, 500° C.—100.0%

Catalyst Preparation Example 4

Example 4 provides a procedure of making potassium promoted 1% K—CoNi—MgCeO$_3$ catalyst for ammonia decomposition.

After thermal reduction the catalyst prepared in Example 3, the catalyst is dispersed in 1 wt % aqueous solution of potassium nitrate or ethanolic solution of 1 wt % of potassium nitrate. This is followed by evaporating the solvent at 80° C. Once all the solvent evaporates, the residue is pulverized in a mortar or pestle or in a speed mixer at around 2000 rpm. The fine powder is then thermally reduced again at 600° C. for 1 h.

Ammonia Decomposition Rate (6,000 h$^{-1}$)—450° C.—81%, 475° C.—97.5%, 500° C.—99%

Catalyst Preparation Example 5

Example 5 provides a procedure of making calcium promoted 1% Ca—CoNi—MgSrCeO$_4$ catalyst for ammonia decomposition.

Synthesis is repeated as in Example 1. After thermal reduction, the catalyst is dispersed in 1 wt % aqueous solution of calcium nitrate or ethanolic solution of 1 wt. % of calcium nitrate. This is followed by evaporating the solvent at 80° C. Once all the solvent evaporates, the residue is pulverized in a mortar or pestle or in a speed mixer at around 2000 rpm. The fine powder is then thermally reduced again at 600° C. for 1 h.

Ammonia Decomposition Rate (6,000 h$^{-1}$)—: 450° C.—91.0%, 475° C.—99.5%, 500° C.—100.0%

Catalyst Preparation Example 6

Example 6 provides a procedure of making cesium promoted 1% Cs—CoNi—MgCeSrO$_4$ catalyst for ammonia decomposition.

Synthesis is repeated as in Example 1. After thermal reduction the catalyst is dispersed in 1 wt % aqueous solution of cesium nitrate or ethanolic solution of 1 wt % of cesium hydroxide. This is followed by evaporating the solvent at 80° C. Once all the solvent evaporates, the residue is pulverized in a mortar or pestle or in a speed mixer at around 2000 rpm. The fine powder is then thermally reduced again at 600° C. for 1 h.

Ammonia Decomposition Rate (6,000 h$^{-1}$): 450° C.—92.3%, 475° C.—99.0%, 500° C.—100.0%

Examples 7-8 are described here to demonstrate the preparation process of the catalyst CoNi—MgZrO$_4$, catalyst 1 wt % K—CoNi—MgZrO$_4$

Catalyst Preparation Example 7

Example 7 provides a procedure of making CoNi—MgCeZrO$_4$ catalyst for ammonia decomposition.

4.36 g of cobalt nitrate, 2.31 g of nickel nitrate, 1.6 g of magnesium nitrate, 0.6 g of cerium nitrate and 0.84 g of zirconium oxy-nitrate are added to 100 ml water to prepare solution 1. Solution 2 is prepared by adding 11 g of potassium hydroxide in 100 ml water. The two solutions are separately prepared and stirred till all the salts completely dissolve to give a clear solution. Then, solution 1 is added to solution 2 drop wise with a rate of 1 ml/min. The mixed solution is then aged for 8 h. This is followed by separating the precipitates by centrifugation at 8000 rpm for 5 min followed by washing with water. The centrifugation and washing is repeated at least thrice to remove all residues from the mixture. Then the mixture is dried in vacuum at 60° C. for 8 h. After drying, the solid residue is pulverized in a speed mixer or ball mill for 10 min. The fine powder is then thermally reduced at 600° C. for 1 h. A ramping at a rate of 2° C./min is used to increase the temperature of furnace from 25° C. to 600° C.

Ammonia Decomposition Rate (6,000 h$^{-1}$): 450° C.—75.0%, 475° C.—84.0%, 500° C.—90.0%

Catalyst Preparation Example 8

Example 8 provides a procedure of making potassium promoted 1% K—CoNi—MgCeZrO$_4$ catalyst for ammonia decomposition.

Synthesis is repeated as in Example 7. After thermal reduction the catalyst is dispersed in 1 wt % aqueous solution of potassium nitrate or ethanolic solution of 1 wt % of potassium hydroxide. This is followed by evaporating the solvent at 80° C. Once all the solvent evaporates, the residue is pulverized in a mortar or pestle or in a speed mixer at around 2000 rpm. The fine powder is then thermally reduced again at 600° C. for 1 h.

Ammonia Decomposition Rate (6,000 h$^{-1}$): 450° C.—79.0%, 475° C.—89.5.0%, 500° C.—93.4%

Catalyst Preparation Example 9

Example 9 provides a procedure of making bimetallic nitride of Co and Ni catalyst supported on MgCeO$_3$ as a catalyst for ammonia decomposition.

Synthesis is repeated as in Example 3. For nitridation, thermal reduction is done in pure NH$_3$ balanced at 700° C. for 3 h.

After cooling down, the sample is tested for NH$_3$ decomposition activity.

Ammonia Decomposition Rate (6,000 h$^{-1}$): 450° C.—50.25%, 475° C.—73.50%, 500° C.—88.32%, 575° C.—99%

Figure 1:
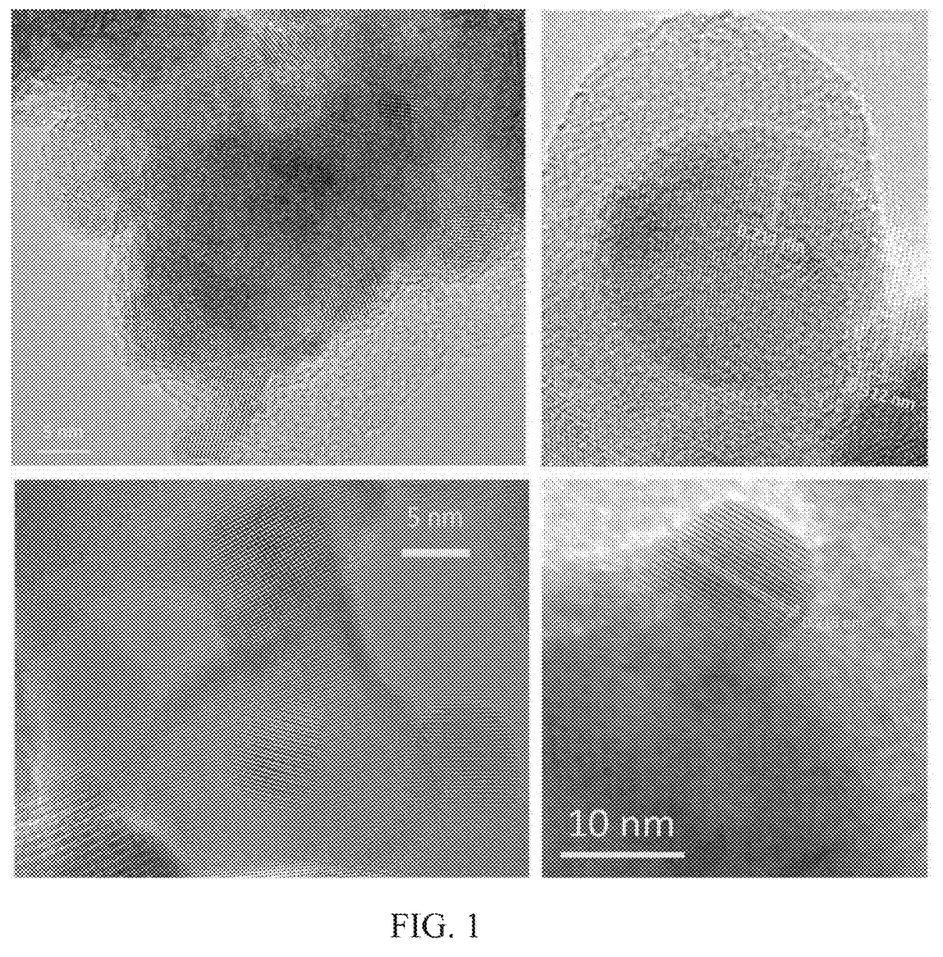
FIG. 1 shows a high resolution transmission electron microscopy (HRTEM) image of CoNi alloy on $MgSrCeO_4$ catalyst, in accordance with various embodiments.
Figure 2:
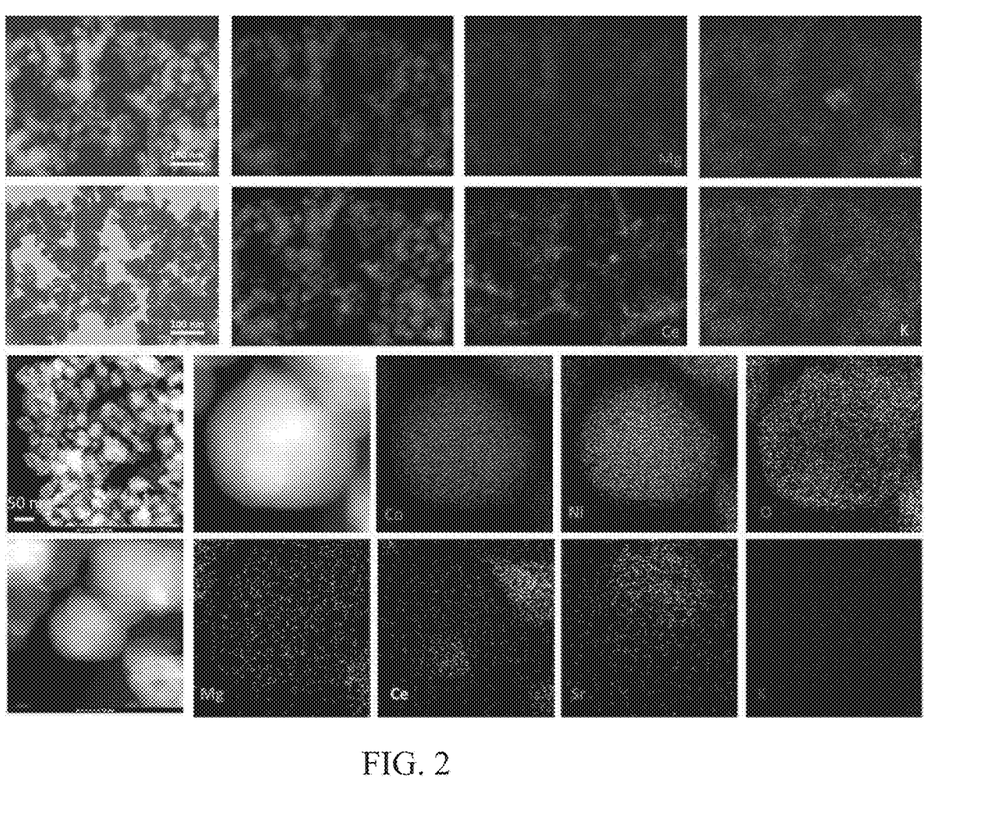
FIG. 2 shows an elemental mapping of CoNi alloy on $MgSrCeO_4$ catalyst, shown in two different scale bars, in accordance with various embodiments.
Figure 3:
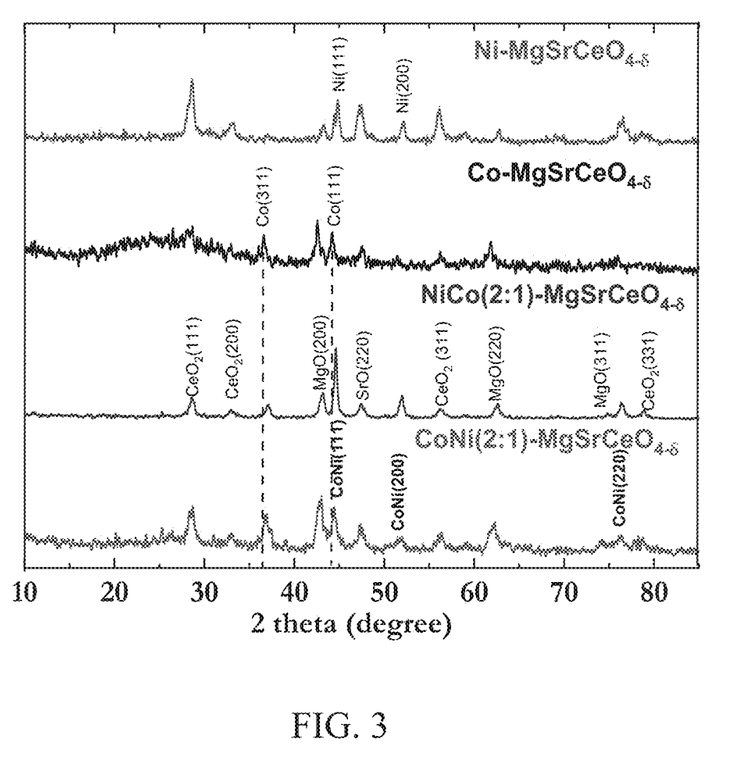
FIG. 3 shows a XRD of monometallic Co, Ni $MgSrCeO_4$ compared to bimetallic CoNi alloy on $MgSrCeO_4$, in accordance with various embodiments.
Figure 4:
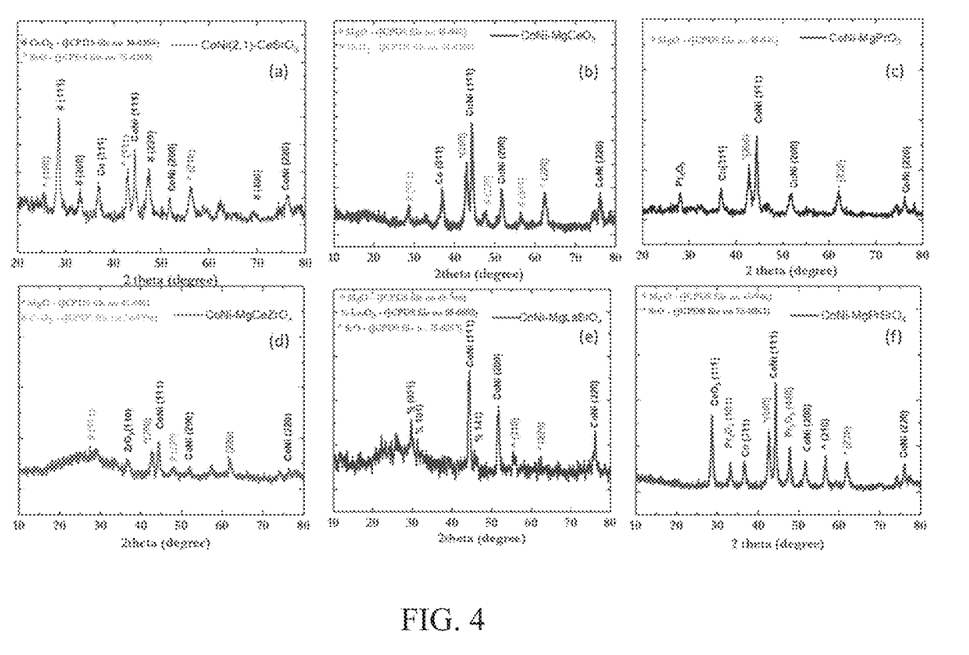
FIG. 4 shows a XRD of bimetallic CoNi on other oxides like $CeSrO_3$, $MgCeO_3$, $MgPrO_3$, $MgCeZrO_4$, $MgLaSrO_4$, $MgPrSrO_4$, in accordance with various embodiments.
Figure 5:
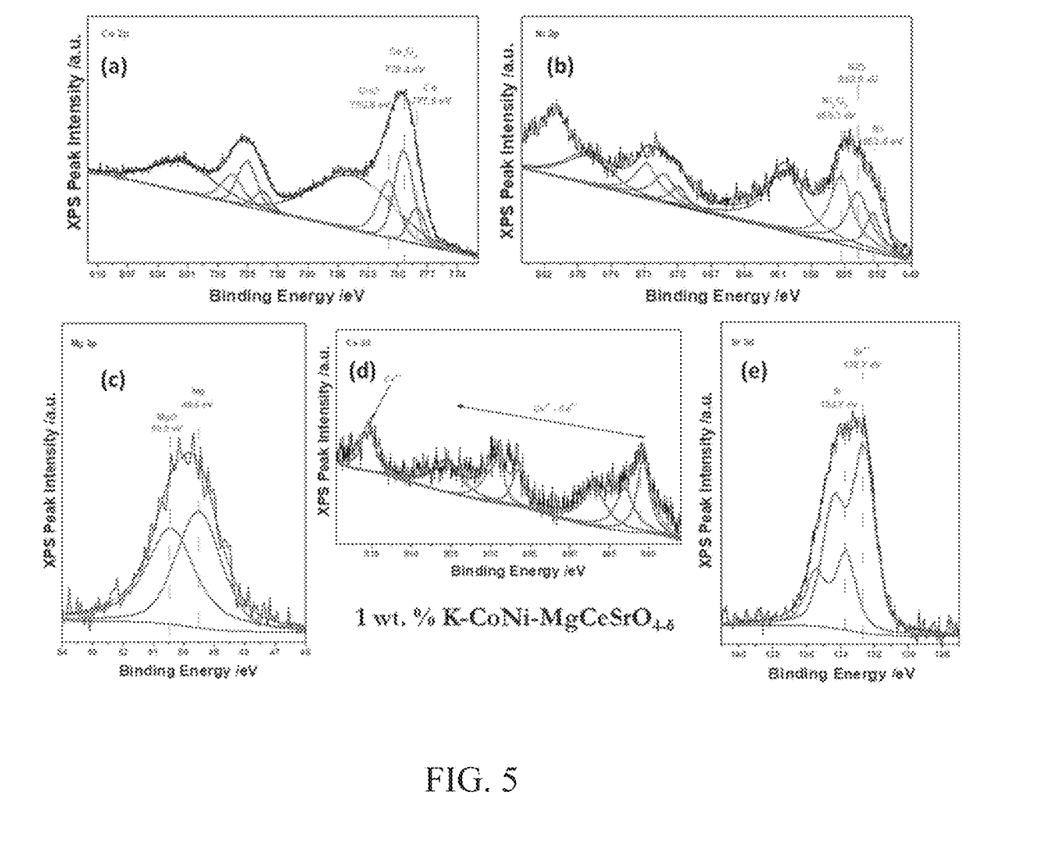
FIG. 5 shows a XPS spectroscopy of 1 wt % K—CoNi—MgCeSrO, (a) confirms presence of Co, CoO and $Co_3O_4$, (b) confirms presence of Ni, NiO and $Ni_3O_4$, (c) magnesium is present as MgO as well as reduced state, (d) $Ce^{3+}$ and $Ce^{4+}$ state of cerium is observed, and (e) strontium is also present as metal as well as metal oxide, in accordance with various embodiments.
Figure 6:
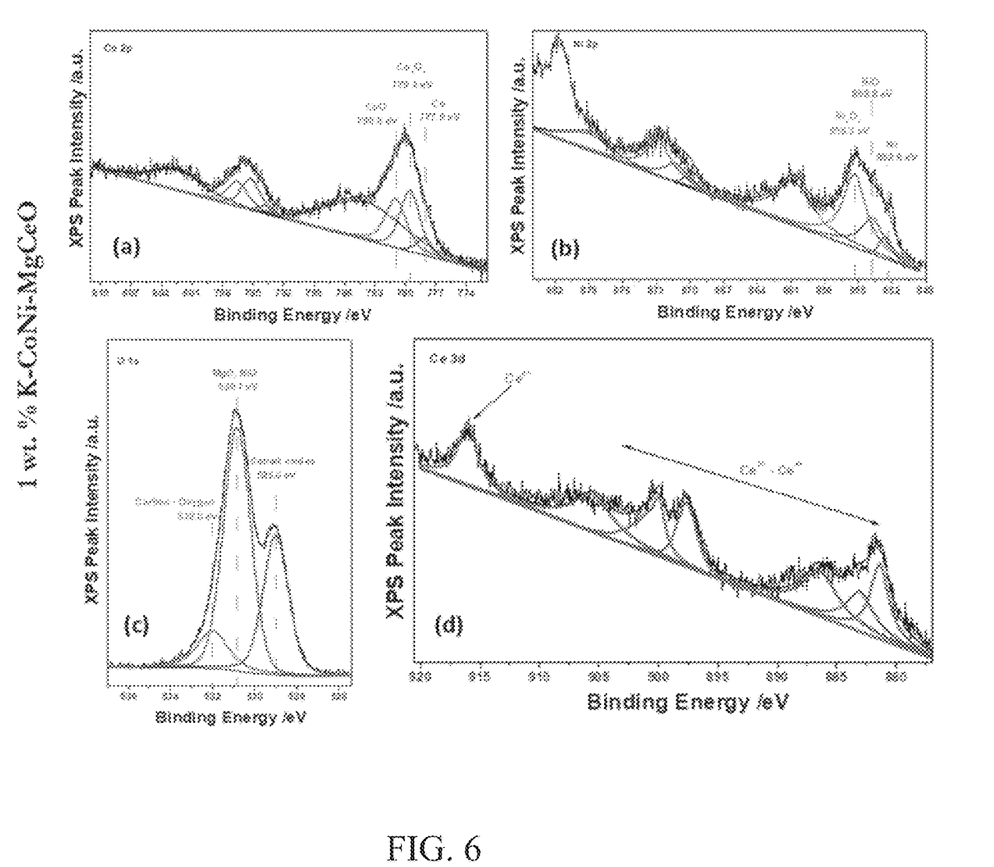
FIG. 6 shows a XPS spectroscopy of 1 wt % K—CoNi—MgCeO, (a) confirming presence of Co,CoO and $Co_3O_4$, (b) confirms presence of Ni, NiO and $Ni_3O_4$, (c) confirming presence of magnesium as MgO as well as reduced state, (d) $Ce^{3+}$ and $Ce^{4+}$ state of cerium is observed, in accordance with various embodiments.
Figure 7:
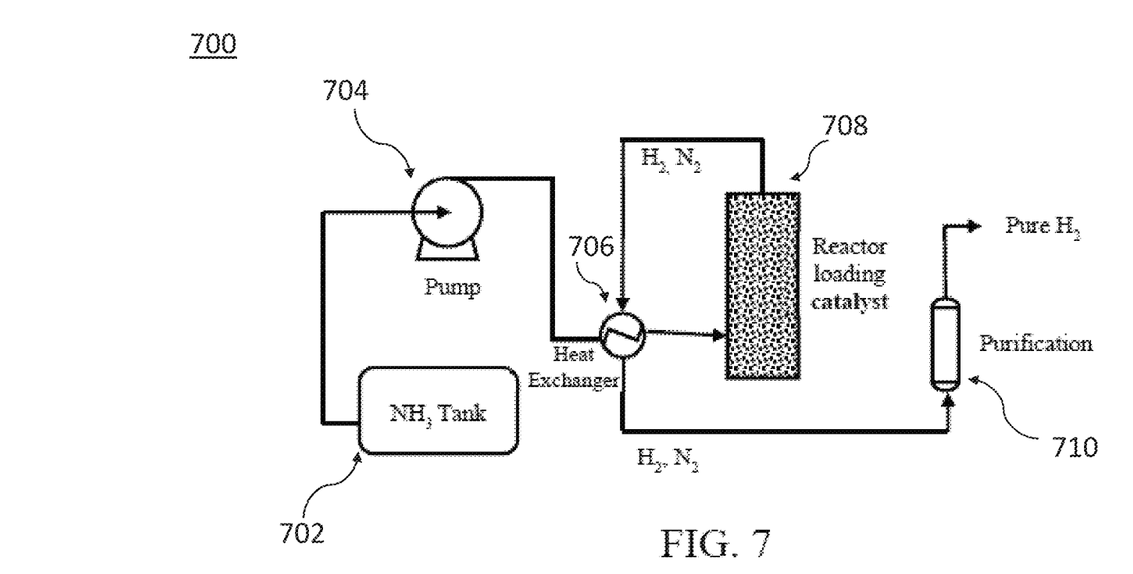
FIG. 7 shows an ammonia cracking reactor loaded with the catalyst, showing pure ammonia is being decomposed into hydrogen and nitrogen, wherein pure hydrogen is then obtained through a purification unit, in accordance with various embodiments.

FIG. 7 is a system for decomposing ammonia. In an embodiment, system 700 includes a tank 702, a pump 704, a heat exchanger 706, a reactor 708, and a purification unit 710. In an embodiment, liquid ammonia from ammonia tank 702 may be pumped via pump 704 into heat exchanger 706 to be vaporized and heated to the temperature range 100-200° C. The gaseous ammonia then goes into the reactor 708 loaded with the catalyst and heated with a furnace for the decomposition reaction. As noted above, the catalyst is beneficial for at least the reason that it can decompose the ammonia at various temperatures, including, but not limited to, temperatures ranging between less than 100° C. and temperatures above 1000° C. and at pressures below 10 atm and above 100 atm. Thus, at various embodiments widely ranging in temperature and pressure, thee ammonia may be decomposed in the reactor into hydrogen and nitrogen under the catalytic reaction. The hydrogen and nitrogen mixture leaves the reactor 708 for the heat exchanger 706 to cool down, and is then purified in the purification unit 710 to obtain hydrogen.

It will be apparent to those skilled in the art that various modifications and variations can be made in the present invention without departing from the scope or spirit of the invention. Other embodiments of the invention will be apparent to those skilled in the art from consideration from this specification and practice of the invention disclosed herein. It is intended that the specification and examples be considered as exemplary only, with a true scope and spirit of the invention being indicated by the following claims.

We claim a catalyst for ammonia decomposition, which consists of:

1. A catalyst, adapted for use in ammonia decomposition, comprising:
   a first element comprising cobalt; chromium, manganese, and vanadium;
   a second element comprising nickel;
   a support; and
   a promoter;
   wherein the first element and the second element are combined to form
   an alloy;
   wherein the alloy is supported on the support, the support comprising a mixed oxide of:
      comprising at least two of magnesium oxide, calcium oxide, strontium oxide and barium oxide; and at least one of cerium oxide, lanthanum oxide, and praseodymium oxide; and
   wherein the promoter is an alkali metal.

2. The catalyst of claim 1, wherein the alkali metal of the promoter is at least one of potassium, cesium, sodium, lithium, and rubidium.

3. The catalyst of claim 1, wherein the catalyst comprises the first element and the second element at a concentration between fifteen percent and eighty-five percent by mass.

4. The catalyst of claim 1, wherein the alloy is a bimetallic nanocluster.

5. A system for decomposing ammonia, comprising:
a catalyst of claim 1;
a liquid comprising ammonia;
a pump;
a heat exchanger for vaporizing the liquid ammonia;
a reactor; and
a purification unit;
wherein the liquid is contained in a container, wherein the pump is configured to receive the liquid from the container and guide the liquid to a heat exchanger, wherein the heat exchanger is configured to vaporize the liquid into a vapor and feed the vapor to a reactor, wherein the reactor comprises the catalyst and is configured to decompose the vapor into a mixture comprising hydrogen and nitrogen, and wherein the reactor is configured to guide the mixture to the heat exchanger, wherein the heat exchanger is further configured to reduce a temperature of the mixture and guide the liquid to the purification unit, and wherein the purification unit is configured to separate the hydrogen from the mixture.

6. The system of claim 5, wherein the heat exchanger is configured to adjust the temperature of the liquid to temperatures below 500 degrees Celsius.

7. The system of claim 5, wherein the heat exchanger is configured to adjust the temperature of the liquid to temperatures at or above 500 degrees Celsius.

8. A system, comprising:
a liquid comprising ammonia; and
a catalyst of claim 1.

\* \* \* \* \*